(12) United States Patent
Sullivan

(10) Patent No.: US 12,440,109 B2
(45) Date of Patent: Oct. 14, 2025

(54) DIRECT CURRENT (DC) VOLTAGE RESPIRATION DETECTOR

(71) Applicant: WEST AFFUM HOLDINGS DAC, Dublin (IE)

(72) Inventor: Joseph L. Sullivan, Kirkland, WA (US)

(73) Assignee: WEST AFFUM HOLDINGS DAC, Dublin (IE)

( * ) Notice: Subject to any disclaimer, the term of this patent is extended or adjusted under 35 U.S.C. 154(b) by 1052 days.

(21) Appl. No.: 17/061,551

(22) Filed: Oct. 1, 2020

(65) Prior Publication Data
US 2021/0100457 A1 Apr. 8, 2021

Related U.S. Application Data

(60) Provisional application No. 62/911,024, filed on Oct. 4, 2019.

(51) Int. Cl.
| | |
|---|---|
| A61B 5/0205 | (2006.01) |
| A61B 5/282 | (2021.01) |
| A61B 5/304 | (2021.01) |
| A61B 5/316 | (2021.01) |
| A61B 5/352 | (2021.01) |
| A61N 1/39 | (2006.01) |
| G01R 27/14 | (2006.01) |
| G16H 20/30 | (2018.01) |
| A61B 5/085 | (2006.01) |

(52) U.S. Cl.
CPC ............ *A61B 5/0205* (2013.01); *A61B 5/282* (2021.01); *A61B 5/304* (2021.01); *A61B 5/316* (2021.01); *A61B 5/352* (2021.01); *A61N 1/3904* (2017.08); *A61N 1/3925* (2013.01); *A61N 1/3987* (2013.01); *G01R 27/14* (2013.01); *G16H 20/30* (2018.01); *A61B 5/086* (2025.01)

(58) Field of Classification Search
None
See application file for complete search history.

(56) References Cited

U.S. PATENT DOCUMENTS

| | | | |
|---|---|---|---|
| 3,724,355 A | 4/1973 | Unger | |
| 3,724,455 A | 4/1973 | Unger | |
| 4,577,639 A * | 3/1986 | Simon | A61B 5/276 |
| | | | 600/509 |
| 4,583,524 A | 4/1986 | Hutchins | |

(Continued)

FOREIGN PATENT DOCUMENTS

| | | |
|---|---|---|
| DE | 102005060985 A1 | 6/2007 |
| EP | 2305110 A1 | 4/2011 |

(Continued)

OTHER PUBLICATIONS

Klein, H. U., Goldenberg I., & Moss, A. J., Risk Stratification for Implantable Cardioverter Defibrillator Therapy: The Role of the Wearable Cardioverter-Defibrillator, Clinical update, European Heart Journal, May 31, 2013, pp. 1-14, doi:10.1093/eurheartj/eht167, European Society of Cardiology.

(Continued)

*Primary Examiner* — Michael R Bloch
(74) *Attorney, Agent, or Firm* — Polsinelli PC

(57) ABSTRACT

Technologies and implementations for determining a respiration rate of a person from heart rate monitoring signal is disclosed.

19 Claims, 11 Drawing Sheets

(56) References Cited

U.S. PATENT DOCUMENTS

| | | | |
|---|---|---|---|
| 4,610,254 A * | 9/1986 | Morgan | A61N 1/3937 607/6 |
| 4,619,265 A * | 10/1986 | Morgan | A61N 1/3904 600/536 |
| 4,666,432 A | 5/1987 | McNeish et al. | |
| 4,698,848 A | 10/1987 | Buckley | |
| 4,928,690 A | 5/1990 | Heilman et al. | |
| 4,955,381 A | 9/1990 | Way et al. | |
| 5,078,134 A | 1/1992 | Heilman et al. | |
| 5,228,449 A | 7/1993 | Christ et al. | |
| 5,348,008 A | 9/1994 | Bornn et al. | |
| 5,353,793 A | 10/1994 | Bornn | |
| RE34,800 E | 11/1994 | Hutchins | |
| 5,394,892 A | 3/1995 | Kenny | |
| 5,405,362 A | 4/1995 | Kramer et al. | |
| 5,429,593 A | 7/1995 | Matory | |
| 5,474,574 A | 12/1995 | Payne et al. | |
| 5,618,208 A | 4/1997 | Crouse et al. | |
| 5,662,690 A | 9/1997 | Cole et al. | |
| 5,708,978 A | 1/1998 | Johnsrud | |
| 5,741,306 A | 4/1998 | Glegyak et al. | |
| 5,782,878 A | 7/1998 | Morgan et al. | |
| 5,792,204 A | 8/1998 | Snell | |
| 5,902,249 A | 5/1999 | Lyster | |
| 5,913,685 A | 6/1999 | Hutchins | |
| 5,944,669 A | 8/1999 | Kaib | |
| 6,047,203 A | 4/2000 | Sackner et al. | |
| 6,065,154 A | 5/2000 | Hulings et al. | |
| 6,108,197 A | 8/2000 | Janik | |
| 6,148,233 A | 11/2000 | Owen et al. | |
| 6,201,992 B1 | 3/2001 | Freeman | |
| 6,263,238 B1 | 7/2001 | Brewer et al. | |
| 6,280,461 B1 | 8/2001 | Glegyak et al. | |
| 6,287,328 B1 | 9/2001 | Snyder et al. | |
| 6,304,780 B1 | 10/2001 | Owen et al. | |
| 6,319,011 B1 | 11/2001 | Motti et al. | |
| 6,334,070 B1 | 12/2001 | Nova et al. | |
| 6,356,785 B1 | 3/2002 | Snyder | |
| 6,427,083 B1 | 7/2002 | Owen et al. | |
| 6,437,083 B1 | 8/2002 | Brack et al. | |
| 6,450,942 B1 | 9/2002 | Lapanashvili et al. | |
| 6,516,218 B1 * | 2/2003 | Cheng | A61B 5/276 600/509 |
| 6,529,875 B1 | 3/2003 | Nakajima | |
| 6,546,285 B1 | 4/2003 | Owen et al. | |
| 6,671,545 B2 | 12/2003 | Fincke | |
| 6,681,003 B2 | 1/2004 | Linder et al. | |
| 6,762,917 B1 | 7/2004 | Verbiest et al. | |
| 7,065,401 B2 | 6/2006 | Worden | |
| 7,099,715 B2 | 8/2006 | Korzinov et al. | |
| 7,212,850 B2 | 5/2007 | Prystowsky et al. | |
| 7,340,294 B2 * | 3/2008 | Gray | A61B 5/053 600/512 |
| 7,559,902 B2 | 7/2009 | Ting et al. | |
| 7,587,237 B2 | 9/2009 | Korzinov et al. | |
| 7,753,759 B2 | 7/2010 | Pintor et al. | |
| 7,865,238 B2 | 1/2011 | Brink | |
| 7,870,761 B2 | 1/2011 | Valentine et al. | |
| 7,907,996 B2 | 3/2011 | Prystowsky et al. | |
| 7,941,207 B2 | 5/2011 | Korzinov | |
| 7,974,689 B2 | 7/2011 | Volpe et al. | |
| 8,135,462 B2 | 3/2012 | Owen et al. | |
| 8,140,154 B2 | 3/2012 | Donnelly et al. | |
| 8,369,944 B2 | 2/2013 | Macho et al. | |
| 8,527,028 B2 | 9/2013 | Kurzweil et al. | |
| 8,548,557 B2 | 10/2013 | Garstka et al. | |
| 8,560,044 B2 | 10/2013 | Kurzweil et al. | |
| 8,615,295 B2 | 12/2013 | Savage et al. | |
| 8,644,925 B2 | 2/2014 | Volpe et al. | |
| 8,676,313 B2 | 3/2014 | Volpe et al. | |
| 8,706,255 B2 | 4/2014 | Phillips et al. | |
| 8,742,349 B2 | 6/2014 | Urbon et al. | |
| 8,897,860 B2 | 11/2014 | Volpe et al. | |
| 8,904,214 B2 | 12/2014 | Volpe et al. | |
| 8,965,500 B2 | 2/2015 | Macho et al. | |
| 9,008,801 B2 | 4/2015 | Kaib et al. | |
| 9,084,583 B2 | 7/2015 | Mazar et al. | |
| 9,089,685 B2 | 7/2015 | Sullivan et al. | |
| 9,119,547 B2 | 9/2015 | Cazares et al. | |
| 9,131,901 B2 | 9/2015 | Volpe et al. | |
| 9,132,267 B2 | 9/2015 | Kaib | |
| 9,265,432 B2 | 2/2016 | Warren et al. | |
| 9,345,898 B2 | 5/2016 | Piha et al. | |
| 9,408,548 B2 | 8/2016 | Volpe et al. | |
| 9,445,719 B2 | 9/2016 | Libbus et al. | |
| 9,454,219 B2 | 9/2016 | Volpe et al. | |
| 9,579,020 B2 | 2/2017 | Libbus et al. | |
| 9,592,403 B2 | 3/2017 | Sullivan | |
| 9,598,799 B2 | 3/2017 | Shoshani et al. | |
| 9,675,804 B2 | 6/2017 | Whiting et al. | |
| 9,724,008 B2 | 8/2017 | Sullivan et al. | |
| 9,878,171 B2 | 1/2018 | Kaib | |
| 9,895,105 B2 | 2/2018 | Romem | |
| 9,901,741 B2 | 2/2018 | Chapman et al. | |
| RE46,926 E | 7/2018 | Bly et al. | |
| 10,016,613 B2 | 7/2018 | Kavounas | |
| 10,076,656 B2 | 9/2018 | Dar et al. | |
| 10,192,387 B2 | 1/2019 | Brinig et al. | |
| 10,307,133 B2 | 6/2019 | Kaib | |
| 10,463,867 B2 | 11/2019 | Kaib et al. | |
| 10,589,110 B2 | 3/2020 | Oskin et al. | |
| 10,599,814 B2 | 3/2020 | Landrum et al. | |
| 2002/0181680 A1 | 12/2002 | Linder et al. | |
| 2003/0158593 A1 | 8/2003 | Heilman et al. | |
| 2005/0107833 A1 | 5/2005 | Freeman et al. | |
| 2005/0107834 A1 | 5/2005 | Freeman et al. | |
| 2006/0173499 A1 | 8/2006 | Hampton et al. | |
| 2008/0312709 A1 | 12/2008 | Volpe et al. | |
| 2009/0005827 A1 | 1/2009 | Weintraub et al. | |
| 2010/0007413 A1 | 1/2010 | Herleikson | |
| 2010/0298899 A1 | 11/2010 | Donnelly et al. | |
| 2011/0022105 A9 | 1/2011 | Owen et al. | |
| 2011/0288604 A1 | 11/2011 | Kaib et al. | |
| 2011/0288605 A1 | 11/2011 | Kaib et al. | |
| 2012/0046706 A1 * | 2/2012 | Anderson | A61N 1/3925 607/5 |
| 2012/0112903 A1 | 5/2012 | Kaib et al. | |
| 2012/0144551 A1 | 6/2012 | Guldalian | |
| 2012/0150008 A1 | 6/2012 | Kaib et al. | |
| 2012/0158075 A1 | 6/2012 | Kaib et al. | |
| 2012/0191476 A1 | 7/2012 | Reid et al. | |
| 2012/0265265 A1 | 10/2012 | Razavi et al. | |
| 2012/0283794 A1 | 11/2012 | Kaib et al. | |
| 2012/0293323 A1 | 11/2012 | Kaib et al. | |
| 2012/0302860 A1 | 11/2012 | Volpe et al. | |
| 2012/0310315 A1 | 12/2012 | Savage et al. | |
| 2013/0085538 A1 | 4/2013 | Volpe et al. | |
| 2013/0144355 A1 | 6/2013 | Macho et al. | |
| 2013/0231711 A1 | 9/2013 | Kaib | |
| 2013/0245388 A1 | 9/2013 | Rafferty et al. | |
| 2013/0274565 A1 | 10/2013 | Langer et al. | |
| 2013/0304147 A1 * | 11/2013 | Aoyama | G16H 20/30 455/66.1 |
| 2013/0317852 A1 | 11/2013 | Worrell et al. | |
| 2013/0325078 A1 | 12/2013 | Whiting et al. | |
| 2014/0012144 A1 | 1/2014 | Crone | |
| 2014/0025131 A1 | 1/2014 | Sullivan et al. | |
| 2014/0046391 A1 | 2/2014 | Cowan et al. | |
| 2014/0070957 A1 | 3/2014 | Longinotti-Buitoni et al. | |
| 2014/0163663 A1 | 6/2014 | Poddar et al. | |
| 2014/0324112 A1 | 10/2014 | Macho et al. | |
| 2014/0378812 A1 | 12/2014 | Saroka et al. | |
| 2015/0039053 A1 | 2/2015 | Kaib et al. | |
| 2015/0161554 A1 | 6/2015 | Sweeney et al. | |
| 2015/0297135 A1 | 10/2015 | Shoshani et al. | |
| 2015/0328472 A1 | 11/2015 | Sullivan et al. | |
| 2016/0004831 A1 | 1/2016 | Carlson et al. | |
| 2016/0076175 A1 | 3/2016 | Rock et al. | |
| 2016/0076176 A1 | 3/2016 | Rock et al. | |
| 2016/0082277 A1 | 3/2016 | Foshee, Jr. et al. | |
| 2016/0113581 A1 | 4/2016 | Amir et al. | |
| 2016/0256104 A1 | 9/2016 | Romem et al. | |
| 2016/0283900 A1 | 9/2016 | Johnson et al. | |
| 2017/0014073 A1 | 1/2017 | Shoshani et al. | |

(56) References Cited

U.S. PATENT DOCUMENTS

| | | |
|---|---|---|
| 2017/0027469 A1 | 2/2017 | Amir et al. |
| 2017/0036066 A1 | 2/2017 | Chahine |
| 2017/0040758 A1 | 2/2017 | Amir et al. |
| 2017/0162840 A1 | 6/2017 | Pendry |
| 2017/0319862 A1 | 11/2017 | Foshee, Jr. et al. |
| 2017/0367591 A1 | 12/2017 | Jorgensen |
| 2018/0093102 A1* | 4/2018 | Sullivan ............... A61N 1/3987 |
| 2018/0116537 A1 | 5/2018 | Sullivan et al. |
| 2018/0117299 A1 | 5/2018 | Gustavson et al. |
| 2018/0184933 A1 | 7/2018 | Sullivan et al. |
| 2018/0185662 A1 | 7/2018 | Foshee, Jr. et al. |
| 2018/0243578 A1 | 8/2018 | Volosin |
| 2018/0361165 A1 | 12/2018 | Jaax et al. |
| 2019/0030352 A1 | 1/2019 | Sullivan et al. |
| 2019/0076666 A1 | 3/2019 | Medema |
| 2019/0116896 A1 | 4/2019 | Armour et al. |
| 2019/0321650 A1 | 10/2019 | Raymond et al. |

FOREIGN PATENT DOCUMENTS

| | | |
|---|---|---|
| EP | 3380189 B1 | 10/2018 |
| JP | 4320257 B2 | 8/2009 |
| JP | 2014526282 A | 10/2014 |
| JP | 5963767 B2 | 8/2016 |
| WO | 1998039061 A2 | 9/1998 |
| WO | 2011/146448 A1 | 11/2011 |
| WO | 2012064604 A1 | 5/2012 |
| WO | 2012/151160 A1 | 11/2012 |
| WO | 2015/056262 A1 | 4/2015 |

OTHER PUBLICATIONS

Lifecor LifeVest System Model WCD 3100 Operator's Manual, 2006, PN 20B0040 Rev FI, Zoll Lifecor Corporation, Pittsburgh, PA.

LifeVest Model 4000 Patient Manual, Zoll, 2009, PN 20B0047 Rev B.

Heartstart MRx and XL AED Algorithm—Application Note, Jul. 2001, Edition 2 Philips Healthcare, USA.

The LifeVest Network/Patient Data Management System, Zoll, 2015, 20C0503 Rev A.

Metting Van Rijn, A. C., Peper A., & Grimbergen, C. A., High-Quality Recording of Bioelectric Events Part 1: Interference Reduction, Theory and Practice, Review, Medical & Biological Engineering & Computing, Sep. 1990, pp. 389-397, IFMBE.

Pagan-Carlo, et al., "Encircling Overlapping Multipulse Shock Waveforms for Transthoracic Defibrillation," JACC Journals, Dec. 1998, vol. 32 Issue 7, p. 2065-2071.

Zoll, LifeVest, Proven protection from Sudden Cardiac Death, 2017, 4 pages. Pittsburgh PA, USA.

International Search Report and Written Opinion for PCT Application No. PCT/US2015/051726, dated May 20, 2016, European Patent Office, Rijswijk, 11 pages.

* cited by examiner

500 A computer program product

502 A signal bearing medium 504 at least one of machine readable non-transitory medium having stored therein instructions that, when executed by one or more processors, operatively enable determination of a respiration rate utilizing heart monitor signals:

inject a direct current (DC) signal into two electrodes of a wearable cardioverter defibrillator;

receive an indication of a change of the DC signal at one of the two electrodes, the received indication being included in a plurality of electrical signals; and separate the received indication of the change of the DC signal from the received plurality of electrical signals, the separated received indication corresponding to a respiration rate of a user of the WCD.

| 506 a computer-readable medium | 508 a recordable medium | 510 a communications medium |

Figure 5

700 A computer program product

702 A signal bearing medium 704 at least one of machine readable non-transitory medium having stored therein instructions that, when executed by one or more processors, operatively enable determination of a respiration rate utilizing heart monitor signals:

inject a direct current (DC) signal into two electrodes of a wearable cardioverter defibrillator (WCD);

receive a plurality of signals determine if the received plurality of electrical signals include an indication of a respiration rate of a user of the WCD; and if it is determined that the received plurality of electrical signals include the indication of the respiration rate of the user, providing an indication on the WCD to confirm a health status of the user.

| 706 a computer-readable medium | 708 a recordable medium | 710 a communications medium |

Figure 7

900 A computer program product

902 A signal bearing medium 904 at least one of machine readable non-transitory medium having stored therein instructions that, when executed by one or more processors, operatively enable determination of a respiration rate utilizing heart monitor signals:

receive, at a signal processing module, a plurality of electrocardiogram (ECG) signals from a storage device of a heart healthcare device;

determine an indication of a change of an injected direct current (DC) signal at an electrode; and separate the received indication of the change of the DC signal from the received plurality of electrical signals, the separated received indication corresponding to a respiration of a user.

| 906 a computer-readable medium | 908 a recordable medium | 910 a communications medium |

Figure 9

DIRECT CURRENT (DC) VOLTAGE RESPIRATION DETECTOR

RELATED APPLICATION

This application claims benefit of priority to U.S. Provisional Patent Application Ser. No. 62/911,024, filed on Oct. 4, 2019, titled DC RESPIRATION RATE DETECTOR, which is incorporated herein by reference in its entirety for all purposes.

INFORMATION

Unless otherwise indicated herein, the approaches described in this section are not prior art to the claims in this application and are not admitted to be prior art by inclusion in this section.

In addition to monitoring a person's heart, monitoring a person's respiration may facilitate determining a person's health. Accordingly, various health care devices have been developed to monitor respiration. Health care devices capable of monitoring respiration may include various techniques and technologies such as techniques and technologies utilizing flow sensors, acoustic sensors, temperature sensors, humidity sensors, chemical sensors, and motion sensors. Commonly, these respiration monitoring devices may be used in conjunction with heart rhythm monitoring devices to facilitate monitoring and determining the health of a person. For example, a person's health may be monitored by utilizing an electrocardiogram (ECG) device for monitoring the rhythm of the heart along with a thoracic impedance device for monitoring respiration. Utilizing at least these two separate devices may facilitate monitoring both a person's heart and respiration to facilitate determining the person's health.

As health care devices become smaller and personal, using different devices to monitor different health related conditions (e.g., vital signs of heart rhythm and respiration) may be cumbersome and/or complicated. For example, a healthcare device may be capable of monitoring a person's heart to address arrhythmic risk of the person. This type of healthcare device may be a wearable cardioverter defibrillator (WCD). The WCD may include two or more electrodes to monitor the electrical signals of the heart such as an electrocardiogram (ECG) signal. To facilitate monitoring of respiration, a second device such as a transthoracic impedance sensor may be utilized. The transthoracic sensors may include two or more electrodes to determine changes in electrical impedance at the electrodes. The transthoracic impedance device may utilize an alternating current (AC) electrical signal and may include circuitry to demodulate and digitize the AC electrical signal. If a WCD was to be combined with a transthoracic impedance device, this approach would include a separate signal path within the WCD because the transthoracic impedance electrical signal (e.g., detection of respiration) may be separate from the ECG signal. Accordingly, a healthcare device having capabilities of monitoring a person's heart and a person's respiration may be complicated and/or cumbersome.

All subject matter discussed in this section of this document is not necessarily prior art and may not be presumed to be prior art simply because it is presented in this section. Plus, any reference to any prior art in this description is not and should not be taken as an acknowledgement or any form of suggestion that such prior art forms parts of the common general knowledge in any art in any country. Along these lines, any recognition of problems in the prior art are discussed in this section or associated with such subject matter should not be treated as prior art, unless expressly stated to be prior art. Rather, the discussion of any subject matter in this section should be treated as part of the approach taken towards the particular problem by the inventor(s). This approach in and of itself may also be inventive. Accordingly, the foregoing summary is illustrative only and not intended to be in any way limiting. In addition to the illustrative aspects, embodiments, and features described above, further aspects, embodiments, and features will become apparent by reference to the drawings and the following detailed description.

SUMMARY

Described herein are various illustrative methods and systems for improved monitoring of respiration associated with monitoring heart rhythm.

The present disclosure describes instances and examples of utilizing cardiac monitoring systems (e.g., WCD systems), devices, systems, storage media that may store programs, and methods for measuring a person's respiration rate.

In embodiments, utilizing cardiac monitoring systems for measuring a person's respiration rate may include using low-frequency changes in a DC level of a signal. In some embodiments, a small DC current may be injected into each electrode, and the DC voltage of that electrode relative to a reference electrode may be indicative of the electrode resistance. In some embodiments, the respiration rate may be detected in real time and may be utilized as part of device algorithms with no additional circuitry such as a demodulation and digitizing circuitry. In some embodiments having ECG sensing, the respiration rate may be extracted from the ECG signal after the fact for presentation to medical personnel for post-event review. In some embodiments, the respiration rate may be included as part of a rhythm analysis algorithm to help decide if a person requires a shock, or it may be included as part of a heart-failure algorithm that may detect decompensation.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 illustrates an example computer program product, arranged in accordance with at least some embodiments;

FIG. 7 illustrates an example computer program product 700, arranged in accordance with at least some embodiments described herein;

FIG. 9 illustrates an example computer program product 900, arranged in accordance with at least some embodiments described herein;

DETAILED DESCRIPTION

Figure 1:
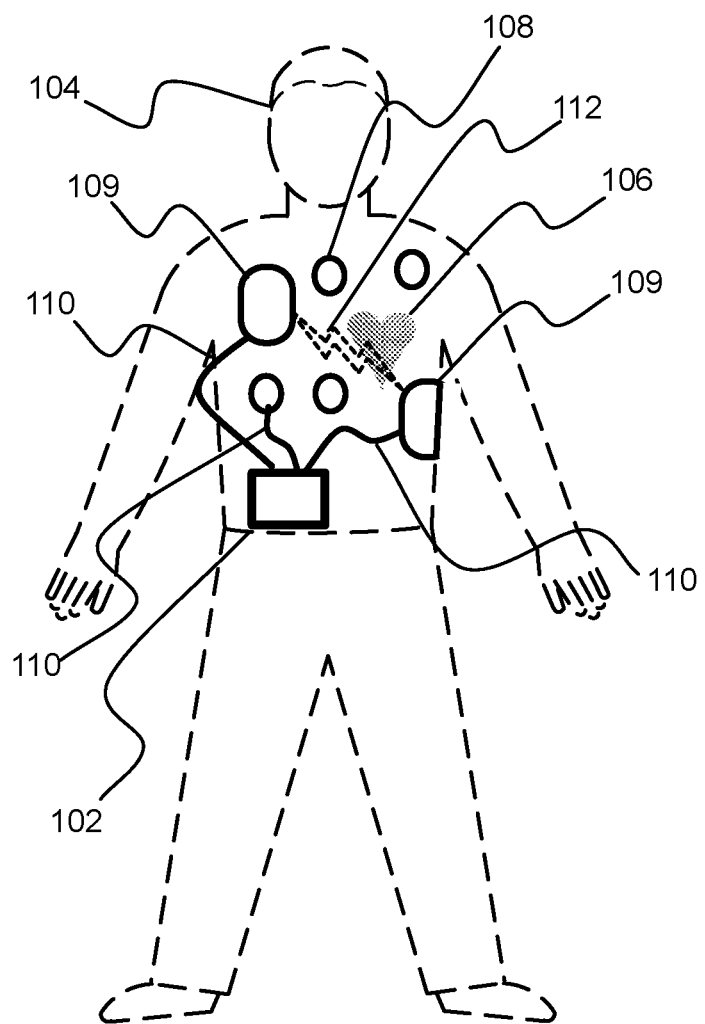
FIG. 1 illustrates an example healthcare device which may be utilized with various embodiments.

The following description sets forth various examples along with specific details to provide a thorough understanding of claimed subject matter. It will be understood by those skilled in the art after review and understanding of the present disclosure, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to method, apparatus, and systems related to a providing an improved monitoring of respiration of a person.

Wearable medical devices (WMD) may be used to facilitate monitoring and treatment of various medical conditions of a person. In order to facilitate monitoring and treatment of medical conditions of a person, a WMD may be worn by the person. A WMD that may be worn by the person to help facilitate monitoring and treatment of the person may include a WMD configured to facilitate monitoring and treatment of potential issues with a person's heart. For example, the person may have a health condition, where the electrical control system of the heart may malfunction, which may cause the heart to beat irregularly or not at all.

This problem with the rate of the heartbeat may be generally referred to as arrhythmia. Arrhythmia may be caused by many factors, but in general, arrhythmia may be caused by a malfunction in the electrical control system of the heart. Some types of arrhythmias may result in inadequate blood flow resulting in reduction or lack of the amount of blood pumped to the various parts of the body. For example, issues with the sinoatrial (SA) node may lead to arrhythmia of some kind. Some arrhythmias may lead to a condition known as sudden cardiac arrest (SCA). In an SCA condition, the heart may fail to pump blood effectively, and as a result, death may occur.

An example type of arrhythmia, which may be associated with SCA, may be a condition known as ventricular fibrillation (VF). VF may be a condition where a ventricle or ventricles, which make up the heart to facilitate the pumping of blood, may make uncoordinated movements instead of steady rhythmic movements. In the VF condition, the heart may not pump adequate amount of blood or may not pump blood at all, which may eventually lead to death.

Another type of arrhythmia, which may be associated with SCA, may be a condition known as ventricular tachycardia (VT).

An electronic device may also be utilized to help treat VF by defibrillating the heart. An example of an electronic device may be a defibrillator device. A defibrillator device may be capable of providing an electrical signal, commonly in the form of an electric shock, to the heart in the VF condition. The defibrillator device may provide the electrical signal to a heart externally (i.e., through the surface of a body) via accessories commonly known as electrodes. The defibrillator device may be in the form of a cardioverter defibrillator (e.g., wearable cardioverter defibrillator or WCD), which may help facilitate providing the electric shock to the heart in the VF condition. As a result, the WCD may help prevent Sudden Cardiac Death (SCD). The WCD may have a number of electrodes to facilitate monitoring of the rhythm of the heart and two electrodes to administer the electric shock. As part of the monitoring (e.g., arrhythmia detection), the WCD may be configured to receive an electrocardiogram (ECG) signal from two or more electrodes (e.g., 5 ECG electrodes) on the skin of the person. In accordance with various embodiments of the present disclosure, along with the monitoring of the person's heart, the person's respiration rate may be monitored utilizing the WCD and the ECG signal.

Before turning to the figures, a non-limiting example application of the various embodiments of the present disclosure may be described. In the non-limiting example, a wearable medical device (WMD) may be utilized to facilitate monitoring and treatment of a person. An example of a WMD to facilitate monitoring and treatment of a person may be a WMD to monitor and treat a person's heart such as, but not limited to, a wearable cardioverter defibrillator (WCD). In one example, the WCD may be made up of two parts, a WCD or an electronics module having majority of the electronic components to facilitate monitoring and/or treatment of the heart and a number of electrodes to facilitate reading of the electrical activities of the heart and to facilitate administration of the treatment (e.g., electrodes to monitor the electrical activities of the heart and electrodes to administer the therapy of an electric shock for defibrillation, cardioversion and/or pacing). The electrodes may be adhered to on the skin, where the contact of the electrodes on the skin may facilitate detection and monitoring of the electrical activities of the person's heart. For example, a number of electrodes (e.g., 5 electrodes) may be configured to monitor the electrical activities of the heart, which may be received as an electrocardiogram (ECG) signal from the electrodes.

If the rhythm of the heart becomes abnormal (e.g., arrythmia is detected), the WCD may be configured to provide a treatment to the person (e.g., a defibrillating shock to the person) via a couple of therapy electrodes. Since the measurement of the ECG signal may rely upon an impedance path from the person's body to the WCD, the integrity of contact between the electrodes and the person's skin may influence the quality of the ECG signal (i.e., correct detection of arrythmia). For example, if an electrode does not have good or no contact on the skin, the impedance between the electrode and the person may change (increase), which may degrade the ECG signal or may even cause errors in the ECG signal. Accordingly, the integrity of contact between the electrodes and the person's skin may influence the efficacy of the treatment and the monitoring of the person's heart (e.g., receiving the ECG signal).

In order to determine the integrity of contact between the electrodes and the person's skin, a lead-off detection methodology may be implemented. An example methodology may be a lead-off detection circuitry, which may be configured to inject a predetermined signal to the electrode and analyzing the response of the signal at the electrode. Depending upon the response of the injected signal, the electrode may be determined to be not connected and/or the strength of the conductive path between the electrode and the person may be determined. This example may utilize direct current (DC) methods (i.e., the predetermined signal may be a DC signal) to determine the integrity of contact. Utilization of DC methods may have a minimal effect on the ECG signal as will be described below.

Continuing with the example of the lead-off detection circuitry above, a DC signal may be injected into the electrodes (e.g., an excitation signal), and changes in the injected DC signal compared to a reference DC voltage may be determined. If the injected DC signal rises up to the reference DC voltage, a lead-off condition may exist (i.e., the electrodes may not be in contact with the skin). If a lead-off condition exists, the injected DC signal may manifest itself as a large change in resistance causing the lead-off detection circuit to facilitate a fault signal to the WCD.

It was determined that changes in the injected DC signal up to or close to the reference voltage may have minimal effect on the ECG signal and manifest itself as small changes in resistance at the electrode with these small changes being included in the electrical signal received from the electrodes (i.e., ECG signal and changes in resistance). Because the ECG signal may be the predominant signal with lead-off circuit providing basically information regarding lead-off condition or close to a lead-off condition (i.e., potential issue with contact with the skin or electrode that may affect the ECG signal), the small change signals may be ignored (e.g., unless is a fault in the system). However, it has been determined that these small change signals may correspond to respiration rate of the person as will be described in further detail below.

As a person breathes, their lungs expand and contract with the help of a diaphragm, and in turn, the person's chest expands and contracts. As the chest expands and contracts, the skin of the person may expand and contract as well (e.g., skin on or near the chest area). Even if the electrode is in full contact with the skin of the person (i.e., proper ECG signal strength), the expansion and contraction of the person's skin may affect the interface between the person's skin and a surface of the electrode. For example, pressure on the electrodes may change with each breath, which may affect the resistance of the electrode. That is, the changes at the interface between the person's skin and the electrode may be detected as small changes in resistance of the electrode when the small DC signal is injected into the system as described above. These small changes may be relatively ignored because unless a fault is detected, the monitoring of the heart (ECG signal) may continue as normal.

In accordance with various embodiments, a small DC signal may be injected into two or more electrodes, and the DC voltage of an electrode relative to a reference electrode may indicate the electrode resistance. The changes in pressure against the electrode, as described above, may change the resistance of the electrode, and these relatively small changes in resistance of the electrode may change the DC signal level. As a result, these changes in the DC level may be utilized to detect respiration rate (i.e., breathing rate) of the person.

The changes in the DC level may be present in the overall electrical signal from the person (e.g., ECG signal). The overall ECG signal may be processed to separate the changes in the DC signal. Once separated, the ECG signal may be further processed to determine a respiration rate of the person.

As the above non-limiting example illustrates, a respiration rate of the person may be determined utilizing DC signals and changes in resistance. Utilizing DC signals facilitate determining a respiration rate without utilizing an alternating current (AC) signal, which may rely upon transthoracic impedance. Accordingly, the above non-limiting example illustrates utilization of a healthcare device configured to facilitate monitoring and treatment of a heart to determine respiration rate without additional components for the healthcare device. As will be described below, determining the respiration rate of a person may be beneficial for a variety of health related conditions.

Turning now to FIG. 1, FIG. 1 illustrates an example healthcare device which may be utilized with various embodiments. In FIG. 1, a healthcare device 102 may be configured to monitor and to treat a person 104. In this example, the healthcare device may be configured to monitor and provide treatment to the person's heart 106 (e.g., a defibrillator device). Accordingly, the healthcare device 102 may include a number of electrodes 108 located proximate to the heart 106 and chest area to facilitate monitoring of the heart 106 (e.g., receive ECG signal). Additionally, two therapy electrodes 109 may be shown, which may be configured to provide treatment of the heart 106 (e.g., provide an electric shock). The number of electrodes 108, including the therapy electrodes 109, may be communicatively coupled to the healthcare device via leads 110.

In FIG. 1, it should be appreciated that the placement of the electrodes 108 and 109 may be in a wide variety of manners such as on the front, the sides, the back, and any combination on the person 104. Additionally, even though each of the electrodes 108 and 109 may be communicatively coupled to the healthcare device 102 via leads 110, some of the leads are not shown to provide a clear view. Further, as previously described, the number of electrodes 108 may be any number of electrodes to facilitate monitoring of the electrical signals of the heart such as, but not limited to, at least two or two or more. Accordingly, the claimed subject matter is not limited in this respect.

In the example of FIG. 1, the healthcare monitor 102 may be a wearable medical device (WMD) such as, but not limited to, a wearable cardioverter defibrillator (WCD). Briefly, the person 104 may utilize the healthcare device 102 to monitor the heart 106 (i.e., the rhythm of the heart) via the number of electrodes 108. If the healthcare device 102 determines that the heart 106 is having an issue (e.g., irregular heart rhythm/arrythmia), the healthcare device 102 may provide a shock 112 via the therapy electrodes 109 as a treatment. As part of the monitoring of the heart 106, the healthcare device 102 may receive electrical signals via the electrodes 108. The electrical signals received by the healthcare device may be in the form of an electrocardiogram (ECG) signal.

In FIG. 1, the healthcare device 102 may include various components to facilitate operation. Some of these components may include various analog components such as, but not limited to, a DC coupled preamplifier. Components such as DC coupled preamplifiers may be implemented in a variety of methodologies such as, but not limited to, discrete circuits and/or integrated devices (e.g., ADAS 1000 available from Analog Devices of Norwood, Massachusetts). The analog components included in the healthcare device 102 may be configured to inject a DC signal to the electrodes 108. Small changes in electrodes 108 resistance may cause a change in the injected DC signal. The changes in the injected DC signal may be included in the ECG signal, and by separating the changes in the injected DC signal from the ECG signal, the person's respiration rate may be determined.

Figure 2:
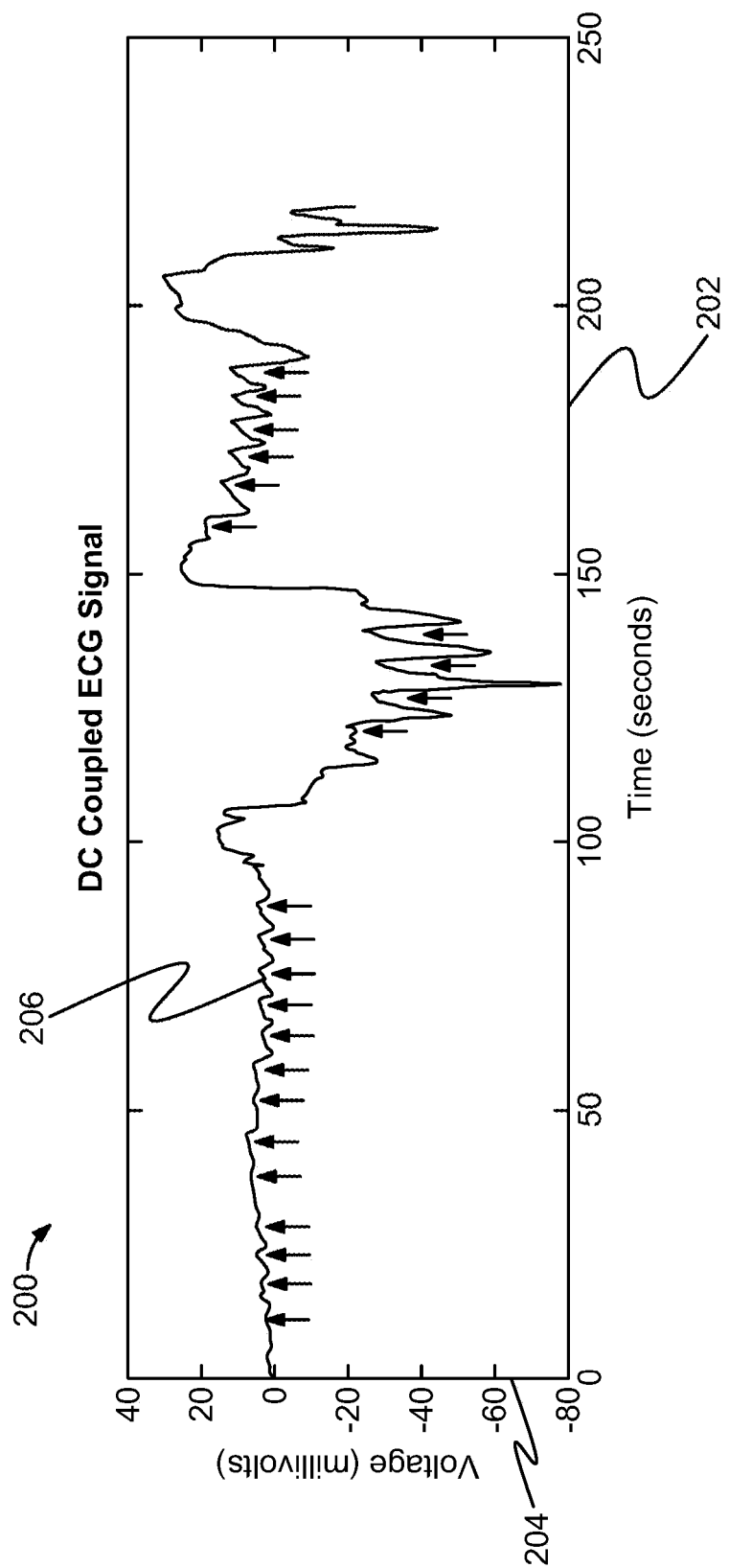
FIG. 2 illustrates a graph of a DC coupled ECG signal in accordance with various embodiments.

FIG. 2 illustrates a graph of a DC coupled ECG signal. The ECG signals shown in FIG. 2 may have been received from a number of electrodes configured to monitor the electrical signals of the heart (e.g., electrodes 108 shown in FIG. 1) to facilitate detection of the malfunction (e.g., arrythmia detection) as previously described. In FIG. 2, the graph 200 may have a horizontal axis 202 corresponding to Time measured in seconds. The graph 200 may have a vertical axis 204 corresponding to Voltage measured in millivolts. As shown, the graph 200 may include indications of changes in the injected DC signal and may be shown by arrows 206. As may be appreciated, the ECG signal may include Q wave, R wave, and S wave (QRS complexes) as electrical impulses spread through the ventricles of the heart 106 (shown in FIG. 1). These QRS complexes may be too small to be seen on the graph 200. However, for the purposes of the present disclosure, the graph 200 having the indications of changes in the injected DC signal 206 may be utilized. Even though the indication of changes of the injected DC signal 206 may be seen on the graph 200, more commonly, these indications 206 may be difficult to see. Accordingly, the indication of changes of the DC signal 206 may be separated from the ECG signal resulting in the indication of changes of the injected DC signal 206 becoming deterministic. The separated signal may correspond to the respiration rate of the person.

Figure 3:
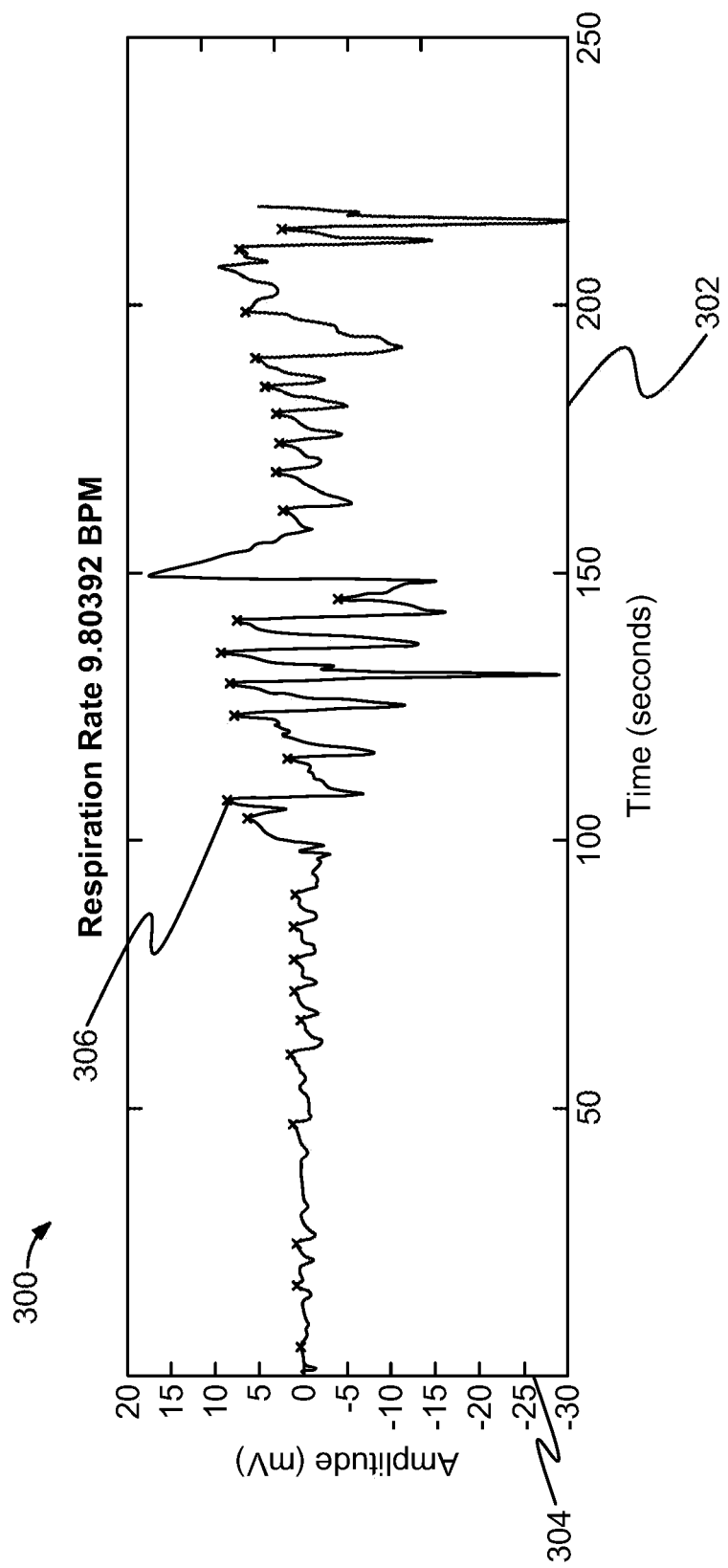
FIG. 3 illustrates a graph of respiration rate separated from a DC coupled ECG signal having been processed, in accordance with various embodiments.

FIG. 3 illustrates a graph of respiration rate separated from a DC coupled ECG signal having been processed, in accordance with various embodiments. In FIG. 3, a graph 300 may have a horizontal axis 302 corresponding to Time measured in seconds. The graph 300 may have a vertical axis 304 corresponding to Amplitude measured in millivolts. In the graph 300, the indications of the changes in the injected DC signal 206 (shown in FIG. 2) may be separated and processed to indicate detection of breaths 306 as peaks. These indications of the detected breaths 306 may correspond to a respiration rate by determining an inverse of the median of the intervals between the detected breaths 306 resulting in a respiration rate of 9.8 breaths per minute. By utilizing an injected DC signal along with ECG signal operation of a healthcare device such as, but not limited to, a defibrillator, a respiration rate may be determined.

It may be appreciated that the above described utilization of the ECG signal with the injected DC signal may be described with respect to a single-channel ECG monitor. However, it is contemplated within the scope of the claimed subject matter that the various embodiments may be applicable to multi-channel ECG monitors that may provide multiple substantially simultaneous ECG channels. In this example, some of the channels may be better suited for determining a respiration rate. Accordingly, an improved accuracy of determined respiration rate may be determined by breath detection on each of the channels by numerically combining the channels by averaging or taking the median or other numerical combination of the respiration rates. Channels with similar respiration rates may be considered to be better suited for determining respiration rates, while channels with outlier values of respiration rates may be considered to be not well suited for determining respiration rates, and accordingly, may be discounted or ignored. That is, channels that provide consistent breathing complex morphology may be preferred over channels that provide inconsistent breathing complex morphology. Both respiration rate similarity and morphology may be utilized to select the channels to be utilized to determine respiration rates. This example of utilizing multiple channels may result in an improved noise-tolerant determination of a respiration rate.

It should be appreciated that it is contemplated within the scope of the claimed subject matter that a variety of healthcare devices that may utilize an ECG signal may include the method of injecting a DC signal to facilitate determination of a respiration rate. This determination of the respiration rate may provide many improvements in monitoring and treatment. In one example, a healthcare device may be configured to monitor and treat a heart condition that may require defibrillation such as, but not limited to, a WCD. If the WCD detects an issue with the rhythm of the heart (e.g., ventricular tachycardia or VT), the WCD would normally defibrillate the heart by providing a shock to the heart. That is, the WCD may detect that the heart rate may fall within the VT zone and the QRS complexes may exceed a predetermined time (e.g., >120 milliseconds) and proceed to shock the heart. However, if the WCD is also configured to determine the respiration rate, in accordance with various embodiments, the WCD may confirm the issue (VT) because if the respiration rate is within a predetermined rate, the heart may not necessarily be shocked. That is, if the respiration rate is between 10 to 25 breaths/minute, the person may be determined to be breathing normally. A person who is breathing normally during a VT event may be experiencing a perfusing VT, which should not be shocked. Accordingly, in one example, the WCD may require some form of confirmation the health status prior to the shock being administered. Alternatively, if the WCD determines both a VT event and a respiration rate is outside normal breathing rates (e.g., non-perfusing VT), the WCD may proceed to provide the necessary shock to the heart to facilitate defibrillation.

It should be appreciated determining respiration rates, as disclosed herein, may have a wide variety of applications. In one example, a person may be wearing a WCD configured to determine respiration rates, in accordance with various embodiments. The person may experience some form of respiratory distress such as, but not limited to, emphysema attack, anaphylactic shock, pulmonary embolism, or other acute respiratory condition. The WCD may be configured to detect the respiratory related distress (e.g., respiration rate falling outside normal rates) and notify a healthcare professional or emergency personnel. In this example, the notification may be implemented as part of a wired or wireless notification system of the WCD without additional components. Accordingly, the WCD with respiration rate detector may be helpful for cardiac patients who may also be susceptible to respiratory conditions.

In another example, monitoring devices for heart failure patients may include a respiration rate detector. As above, the monitoring device may detect a respiration rate outside the normal rates such as an elevated respiration rate. The elevated respiration rate may be a factor associated with heart failure decompensation of the heart failure patient. For this type of monitoring, the respiration rate may be associated with the time of day (e.g., a higher respiration rate at night may indicate an issue with the patient), and/or posture (e.g., a higher respiration rate while lying down may indicate an issue with the patient) resulting in improved sensitivity of the monitoring.

In yet another example, a respiration rate detector may be utilized for a post-event review. For example, instead of real-time determination of respiration rate from an ECG signal, the determination of the respiration rate may be stored and downloaded from a monitoring device for post-event review. In this example, the monitoring device may not necessarily be configured to detect a respiration rate. The downloaded ECG signal may be processed, in accordance with various embodiments herein, to determine a respiration rate from the ECG signal. Even if the ECG signal has been previously high-pass filtered making it more difficult to determine the respiration rate, the ECG signal may have the low-frequency signal restored enabling determination of respiration.

Referring back to FIGS. 2 and 3, in one example process, the signals of FIG. 2 may be processes as follows:
1. Subtract the DC component (i.e. center the DC signal on to zero).
2. Low pass filter to remove QRS complexes. In some examples, a 100 tap finite impulse response (FIR) least-squares filter with passband 0-0.8 Hz and stopband 1.5 Hz and above may be utilized. This assumes a 125 Hz sample rate. In some examples, a different number of taps can be used to implement the FIR least-squares filter. In some examples, different passbands and stopbands may be used. For example, a passband of 0-0.7 Hz and stopband 1.4 Hz and above.
3. Create a smoothed signal with a moving mean smoother with a 2000 sample mean. In other embodiments, a different number of samples may be used in determining the mean.
4. Subtract the smoothed signal from the filtered ECG signal.
5. High pass filter to remove residual artifacts. In some examples, a 250 tap FIR least-squares filter with stopband 0-0.05 Hz and passband 0.2 Hz and above. In some examples, the number of taps, the stopband and the passband may be different.

The above example process may result in separation of the indication of the respiration rates from the QRS complexes to determine the respiration rates as may be shown in FIG. 3. It should be pointed out that the separation of the indication of the respiration rates from the QRS complexes may facilitate determining the QRS complexes (i.e., opposite direction). For example, the signals shown in FIG. 3 may be processed with a high pass filter (e.g., 1 Hz filter) resulting in a separation of the indication of the respiration rates leaving the QRS complexes.

As will be appreciated, the above example process is but only one example, which may be implemented using a variety of signal processing methodology such as, but not limited to, a peak detector having a findpeaks functionality available in matrix laboratory (MATLAB) with a minimum pulse width of 2 seconds, a maximum pulse width of 6 seconds, and a prominence of 1 with MATLAB being available from MathWorks, Inc. of Natick, Massachusetts. Accordingly, the claimed subject matter is not limited in this respect.

The above examples are but a small sampling of the wide variety of applications of the various embodiments of the present disclosure. For example, determination of respiration utilizing heart rate monitors may be applicable to monitor infants at risk for sudden infant death syndrome (SIDS), toxicological issues (e.g., sepsis), physical issues (e.g., pain conditions), psychophysiological stress, diabetic ketoacidosis, sleep apnea, activity monitoring (e.g., heart rate monitoring during physical exercise via wearable monitoring devices), and so forth. Accordingly, the claimed subject matter in not limited in this respect.

Figure 4:
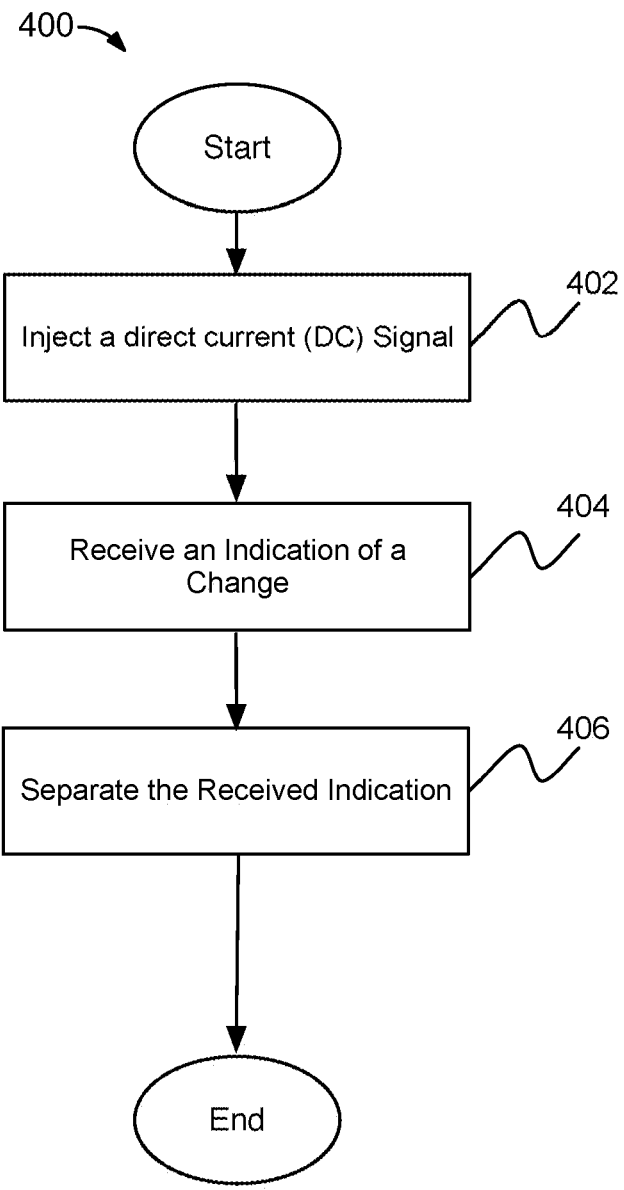
FIG. 4 illustrates an operational flow for determining respiration rate utilizing heart rate monitor signals, arranged in accordance with at least some embodiments.

FIG. 4 illustrates an operational flow for determining respiration rate utilizing heart rate monitor signals, arranged in accordance with at least some embodiments described herein. In some portions of the description, illustrative implementations of the method are described with reference to the elements depicted in FIGS. 1, 2, and 3. However, the described embodiments are not limited to these depictions.

Additionally, FIG. 4 employs block diagrams to illustrate the example methods detailed therein. These block diagrams may set out various functional block or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of the claimed subject matter.

In some examples, operational flow 400 may be employed as part of a heart monitoring device having respiration rate determination capabilities. Beginning at block 402 ("Inject a direct current (DC) Signal"), a healthcare medical device such as, but not limited to, a healthcare monitoring device configured to monitor the heart a wearable cardioverter defibrillator (e.g., WCD) may inject a DC signal into two electrodes of the WCD.

Continuing from block 402 to 404 ("Receive an Indication of a Change"), the WCD may receive an indication of a change of the DC signal at one of the two electrodes, the received indication being included in a number of electrical signals.

Continuing from block 404 to 406 ("Separate the Received Indication"), the received indication of the change of the DC signal may be separated from the received number of signals (e.g., ECG signal), where the separated received indication may correspond to a respiration rate of a user of the WCD.

In general, the operational flow described with respect to FIG. 4 and elsewhere herein may be implemented as a computer program product, executable on any suitable computing system, or the like. For example, a computer program product for determining respiration rate from heart monitoring device may be provided. Example computer program products may be described with respect to FIG. 5 and elsewhere herein.

FIG. 5 illustrates an example computer program product 500, arranged in accordance with at least some embodiments described herein. Computer program product 500 may include machine readable non-transitory medium having stored therein instructions that, when executed, cause the machine determine respiration rate utilizing a heart rate monitoring device, according to the processes and methods discussed herein. Computer program product 500 may include a signal bearing medium 502. Signal bearing medium 502 may include one or more machine-readable instructions 504 which, when executed by one or more processors, may operatively enable a computing device to provide the functionality described herein. In various examples, the devices discussed herein may use some or all of the machine-readable instructions.

In some examples, the machine readable instructions 504 may include injecting a direct current (DC) signal into two electrodes of a wearable cardioverter defibrillator (WCD). In some examples, the machine readable instructions 504 may include receiving an indication of a change of the DC signal at one of the electrodes, the received indication being included in a plurality of electrical signals. In some examples, the machine readable instructions 504 may include separating the received indication of the change of the DC signal from the received plurality of electrical signals, the separated received indication corresponding to a respiration rate of a user of the WCD.

In some implementations, signal bearing medium 502 may encompass a computer-readable medium 506, such as, but not limited to, a hard disk drive, a Compact Disc (CD), a Digital Versatile Disk (DVD), a Universal Serial Bus (USB) drive, a digital tape, memory, etc. In some implementations, the signal bearing medium 502 may encompass a recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communication link, a wireless communication link, etc.). In some examples, the signal bearing medium 502 may encompass a machine readable non-transitory medium.

In general, the methods described with respect to FIG. 4 and elsewhere herein may be implemented in any suitable computing system. Example systems may be described with respect to FIG. 11 and elsewhere herein. In general, the system may be configured to facilitate determination of a respiration rate utilizing a heart rate monitor device.

Figure 6:
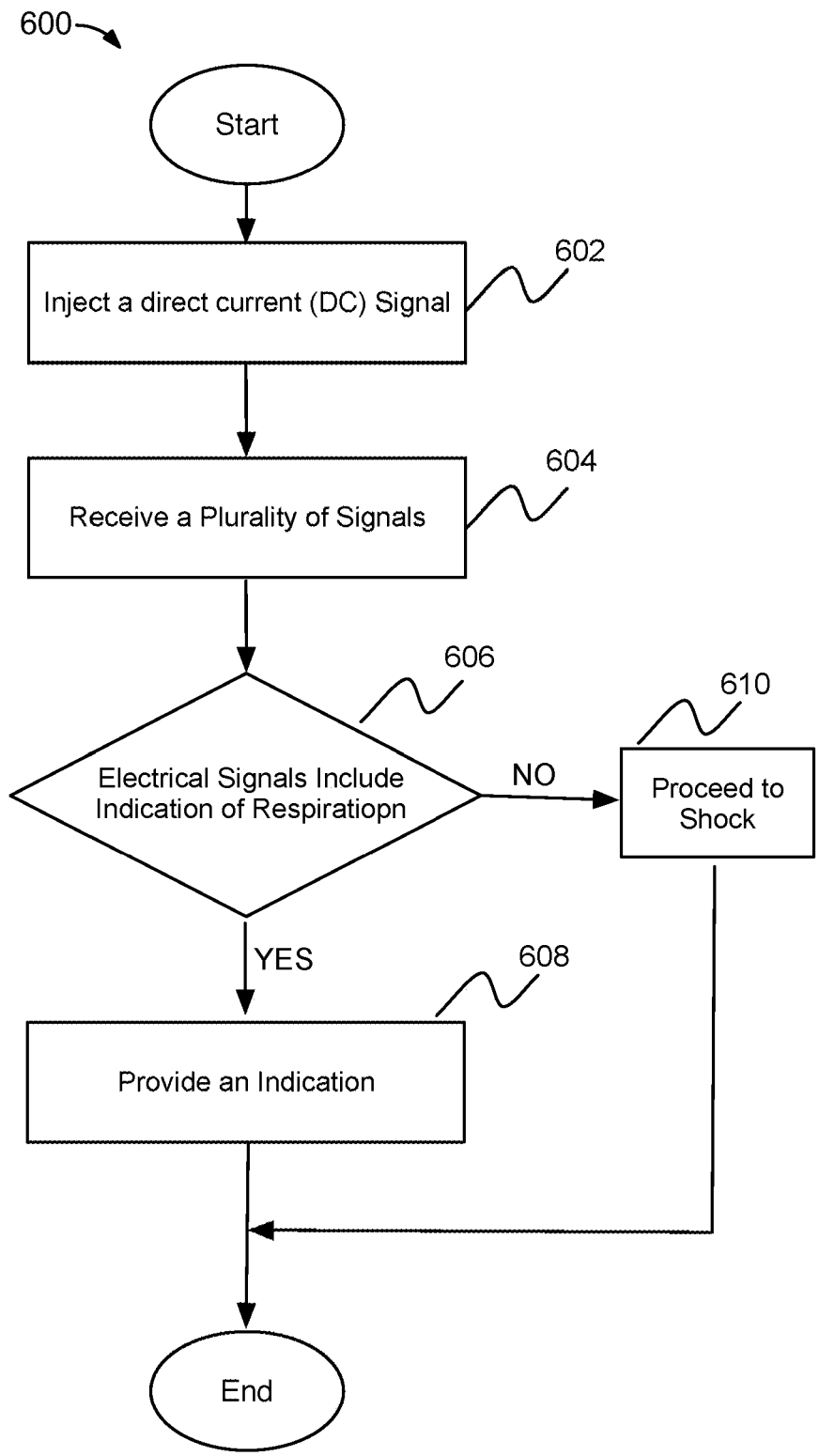
FIG. 6 illustrates an operational flow for determining respiration rate utilizing heart rate monitor signals, arranged in accordance with at least some embodiments described herein.

FIG. 6 illustrates an operational flow for determining respiration rate utilizing heart rate monitor signals, arranged in accordance with at least some embodiments described herein. In some portions of the description, illustrative implementations of the method are described with reference to the elements depicted in FIGS. 1, 2, and 3. However, the described embodiments are not limited to these depictions.

Additionally, FIG. 6 employs block diagrams to illustrate the example methods detailed therein. These block diagrams may set out various functional block or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of the claimed subject matter.

In some examples, operational flow 600 may be employed as part of a heart monitoring device having respiration rate determination capabilities. Beginning at block 602 ("Inject a direct current (DC) Signal"), a healthcare medical device such as, but not limited to, a healthcare monitoring device configured to monitor the heart a wearable cardioverter defibrillator (e.g., WCD) may inject a DC signal into two electrodes of the WCD.

Continuing from block 602 to 604 ("Receive a Plurality of Signals"), the WCD may a number of signals such as, but not limited to, ECG signals.

Continuing from block 604 to decision diamond 606 ("Electrical Signals Include Indication of Respiration), the WCD may determine if the received ECG signal include an indication of a respiration rate of a user.

If it is determined that the received plurality of electrical signals include the indication of the respiration rate of the user, the operation flow may continue to decision diamond 606 to block 608 ("Provide an Indication"), where the indication may be provided to the WCD to confirm a health status of the user. However, if it is determined that the received plurality of signals does not include the indication or respiration of the user, the operation may flow from decision diamond 606 to block 610 ("Proceed to Shock"), where the WCD may proceed to provide a shock to the user.

In general, the operational flow described with respect to FIG. 6 and elsewhere herein may be implemented as a computer program product, executable on any suitable computing system, or the like. For example, a computer program product for determining respiration rate from heart monitoring device may be provided. Example computer program products may be described with respect to FIG. 7 and elsewhere herein.

FIG. 7 illustrates an example computer program product 700, arranged in accordance with at least some embodiments described herein. Computer program product 700 may include machine readable non-transitory medium having stored therein instructions that, when executed, cause the machine to determine respiration rate utilizing a heart rate monitoring device, according to the processes and methods discussed herein. Computer program product 700 may include a signal bearing medium 702. Signal bearing medium 702 may include one or more machine-readable instructions 704 which, when executed by one or more processors, may operatively enable a computing device to provide the functionality described herein. In various examples, the devices discussed herein may use some or all of the machine-readable instructions.

In some examples, the machine readable instructions 704 may include injecting a direct current (DC) signal into two electrodes of a wearable cardioverter defibrillator (WCD). In some examples, the machine readable instructions 704 may include receiving a plurality of electrical signals. In some examples, the machine readable instructions 704 may include determining if the received plurality of electrical signals include an indication of a respiration rate of a user. In some examples, the machine readable instructions 704 may include if it is determined that the received plurality of electrical signals include the indication of the respiration rate of the user, providing an indication on the WCD to confirm a health status of the person.

In some implementations, signal bearing medium 702 may encompass a computer-readable medium 706, such as, but not limited to, a hard disk drive, a Compact Disc (CD), a Digital Versatile Disk (DVD), a Universal Serial Bus (USB) drive, a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communication link, a wireless communication link, etc.). In some examples, the signal bearing medium 702 may encompass a machine readable non-transitory medium.

In general, the methods described with respect to FIG. 6 and elsewhere herein may be implemented in any suitable computing system. Example systems may be described with respect to FIG. 11 and elsewhere herein. In general, the system may be configured to facilitate determination of a respiration rate utilizing a heart rate monitor device.

Figure 8:
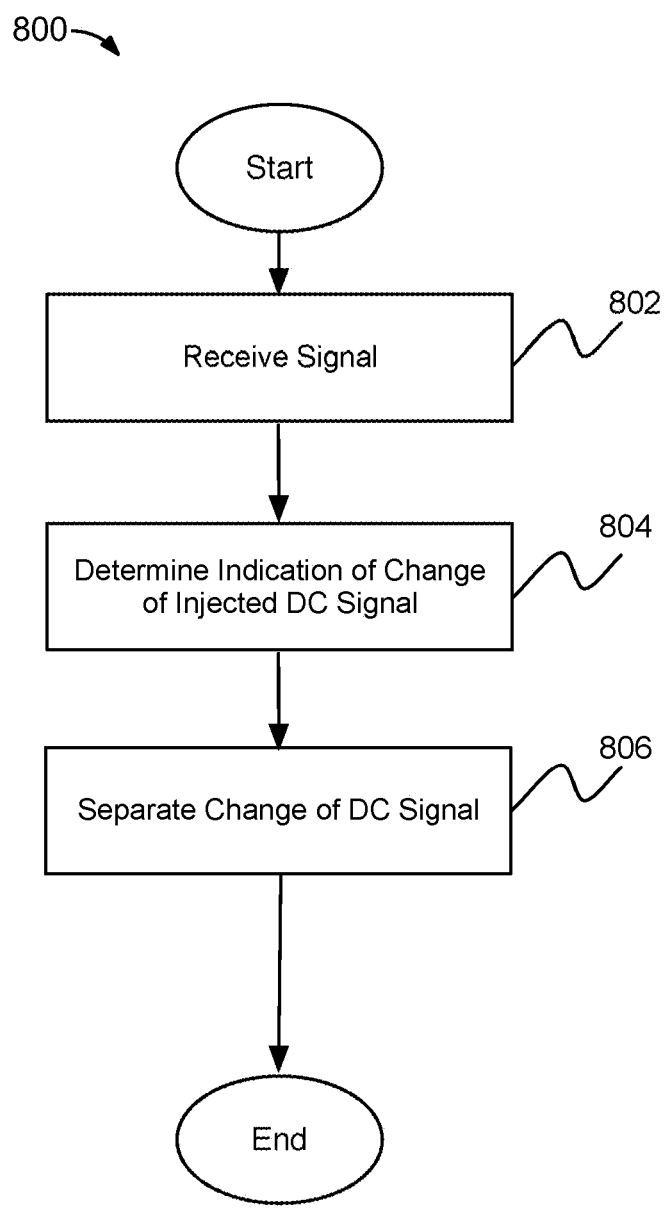
FIG. 8 illustrates an operational flow for determining respiration rate utilizing heart rate monitor signals, arranged in accordance with at least some embodiments described herein.

FIG. 8 illustrates an operational flow for determining respiration rate utilizing heart rate monitor signals, arranged in accordance with at least some embodiments described herein. In some portions of the description, illustrative implementations of the method are described with reference to the elements depicted in FIGS. 1, 2, and 3. However, the described embodiments are not limited to these depictions.

Additionally, FIG. 8 employs block diagrams to illustrate the example methods detailed therein. These block diagrams may set out various functional block or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of the claimed subject matter.

In some examples, operational flow 800 may be employed as part of a heart monitoring device having respiration rate determination capabilities. Beginning at block 802 ("Receive Signal"), at a signal processing module, a plurality of electrocardiogram (ECG) signals may be received from a storage device of a heart healthcare device.

Continuing from block 802 to 804 ("Determine Indication of Change of Injected DC Signal"), an indication of a change of an injected direct current (DC) signal at an electrode may be determined.

Continuing from block 804 to 806 ("Separate Change of DC Signal"), the received indication of the change of the DC signal from the received plurality of electrical signals may be separated. The separated received indication corresponding to a respiration of a user.

In general, the operational flow described with respect to FIG. 8 and elsewhere herein may be implemented as a computer program product, executable on any suitable computing system, or the like. For example, a computer program product for determining respiration rate from heart monitoring device may be provided. Example computer program products may be described with respect to FIG. 7 and elsewhere herein.

FIG. 9 illustrates an example computer program product 900, arranged in accordance with at least some embodiments described herein. Computer program product 900 may include machine readable non-transitory medium having stored therein instructions that, when executed, cause the machine to determine respiration rate utilizing a heart rate monitoring device, according to the processes and methods discussed herein. Computer program product 900 may include a signal bearing medium 902. Signal bearing medium 902 may include one or more machine-readable instructions 904 which, when executed by one or more processors, may operatively enable a computing device to provide the functionality described herein. In various examples, the devices discussed herein may use some or all of the machine-readable instructions.

In some examples, the machine readable instructions 904 may include receiving, at a signal processing module, a plurality of electrocardiogram (ECG) signals from a storage device of a heart healthcare device. In some examples, the machine readable instructions 904 may include determining an indication of a change of an injected direct current (DC) signal at an electrode. In some examples, the machine readable instructions 904 may include separating the received indication of the change of the DC signal from the received plurality of electrical signals, the separated received indication corresponding to a respiration of a user.

In some implementations, signal bearing medium 902 may encompass a computer-readable medium 906, such as, but not limited to, a hard disk drive, a Compact Disc (CD), a Digital Versatile Disk (DVD), a Universal Serial Bus (USB) drive, a digital tape, memory, etc. In some implementations, the signal bearing medium 902 may encompass a recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communication link, a wireless communication link, etc.). In some examples, the signal bearing medium 902 may encompass a machine readable non-transitory medium.

In general, the methods described with respect to FIG. 8 and elsewhere herein may be implemented in any suitable computing system. Example systems may be described with respect to FIG. 11 and elsewhere herein. In general, the system may be configured to facilitate determination of a respiration rate utilizing a heart rate monitor device.

Figure 10:
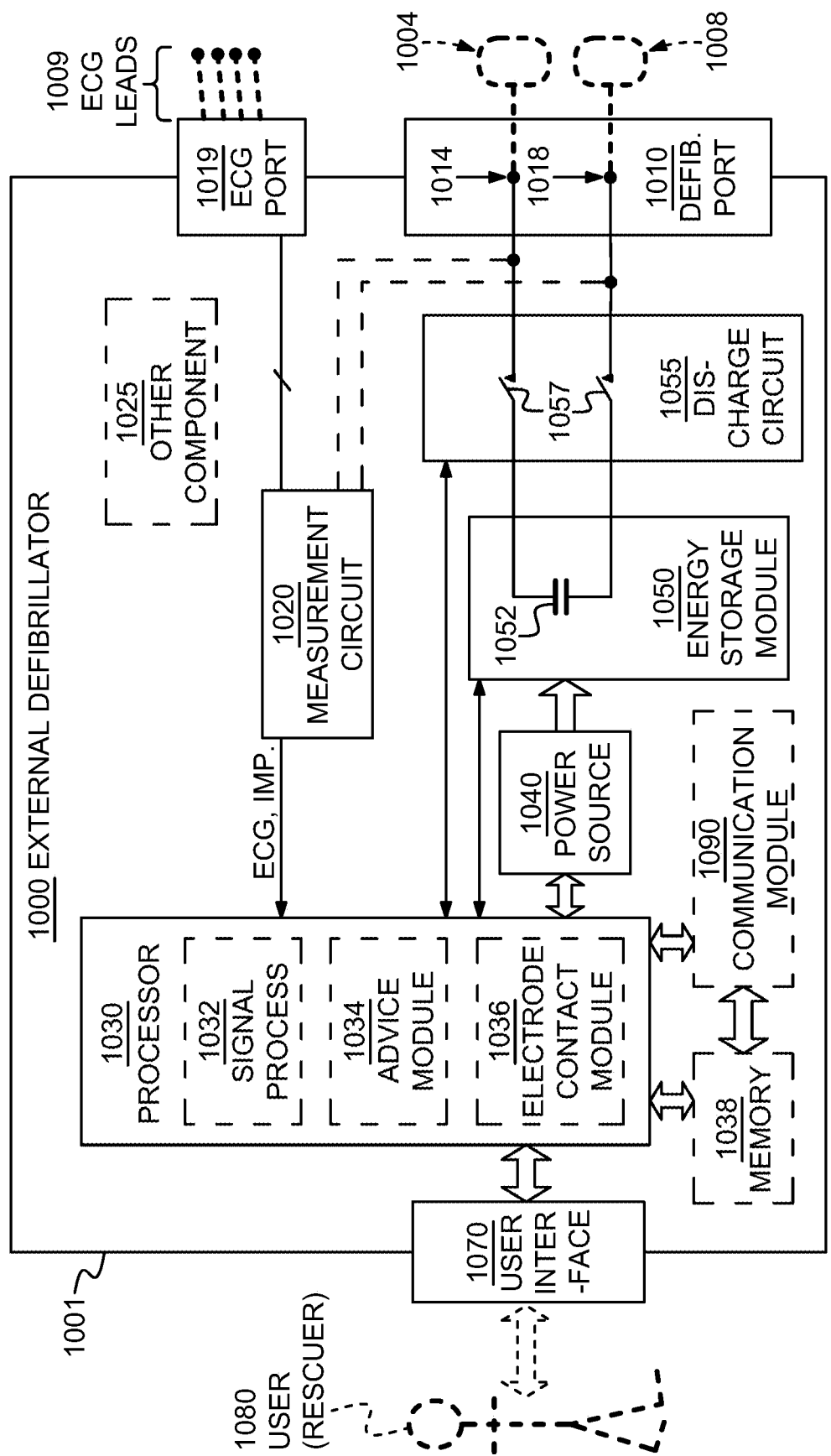
FIG. 10 is a block diagram illustrating components of a heart monitoring device, which may be used with various embodiments.

FIG. 10 is a block diagram illustrating components of a heart monitoring device 1000, which may be used with various embodiments. These components may be, for example, a defibrillator device 102 (shown in FIG. 1).

The defibrillator device 1000 may be intended for use by a user 1080 (e.g., the person 104 shown in FIG. 1). The defibrillator device 1000 may typically include a defibrillation port 1010, such as a socket in housing 1001. The defibrillation port 1010 may include nodes 1014 and 1018. One or more electrodes 1004 and 1008, which may be similar to electrodes 108 (shown in FIG. 1) may be plugged in to the defibrillation port 1010, so as to make electrical contact with nodes 1014 and 1018, respectively. It may also be possible that the electrodes 1004 and 1008 may be connected continuously to the defibrillation port 1010, etc.

Either way, the defibrillation port 1010 may be used for guiding via the electrodes 1004 and 1008 to the person 1080 an electrical charge that may have been stored in the defibrillator device 1000, as described herein.

If the defibrillator device 1000 comprise of a heart monitoring component, as was described herein, the defibrillator device 1000 may also have an ECG port 1019 in the housing 1001, for receiving ECG leads 1009. The ECG leads 1009 may facilitate sensing of an ECG signal (e.g., a 12-lead signal or from a different number of lead signals), and a respiration rate may be determine from the ECG signal, in accordance with the various embodiments disclosed herein. Moreover, a heart monitoring component could have additional ports (not shown), and the other component 1025 may be configured to filter the ECG signal (e.g., application of at least one filter to the signal to help injection of a DC signal to facilitate determination of a respiration rate of the user 1080, in accordance with various embodiments.

The defibrillator 1000 also may include a measurement circuit 1020. The measurement circuit 1020 may receive physiological signals from the ECG port 1019, and also from other ports, if provided (e.g., previously described lead-off circuitry). The circuit 1020 may render detected physiological signals and their corresponding information. The information may be in the form of data, or other signals, etc.

The measurement circuit 1020 may obtain physiological signals through the nodes 1014 and 1018 instead, when the electrodes 1004 and 1008 are attached to the person 1080, as previously described. In these cases, a person's ECG signal may be detected as a voltage difference between the electrodes 1004 and 1008. Additionally, the impedance between the electrodes 1004 and 1008 may detect, among other things, whether the electrodes 1004 and 1008 have been inadvertently disconnected from the person 1080 as previously described, in accordance with various embodiments.

The defibrillator 1000 may also include a processor 1030. The processor 1030 may be implemented in a wide variety of manners for causing actions and operations to be performed. Some examples may include digital and/or analog processors such as microprocessors and digital-signal processors (DSPs), controllers such as microcontrollers, software running in a machine environment, programmable circuits such as Field Programmable Gate Arrays (FPGAs), Field-Programmable Analog Arrays (FPAAs), Programmable Logic Devices (PLDs), Application Specific Integrated Circuits (ASICs), and so on or any combination thereof.

The processor 1030 may include a number of modules. One example module may be a signal processing module 1032, which may detect outputs from the measurement circuit 1020. The signal processing module 1032 may include electronic components configured to separate indication of DC signal changes from ECG signal such as, but not limited to the various processes described above. Accordingly, the person's detected ECG may be utilized to help determine the respiration rate of the person 1080.

In another example, advice module 1034 may provide advice based, at least in part, on outputs of signal processing module 1032. The advice module 1034 may include an algorithm such as, but not limited to, Shock Advisory Algorithm, implement decision rules, and so on. For example, the advice may be to shock, to not shock, to administer other forms of therapy, provide an indication to confirm a health status of the person 1080 (e.g., determine whether the person 1080 is experiencing perfusing or non-perfusing ventricular tachycardia (VT), and so on. If the advice is to shock, some defibrillator examples may report the advice to the user and prompt them to do it. In other examples, the defibrillator device may execute the advice by administering the shock. If the advice is to administer CPR, the defibrillator 1000 may further issue prompts for administrating CPR, and so forth. Examples of Shock Advisory Algorithm may be found in U.S. patent application Ser. No. 15/421,165, filed Jan. 31, 2017 (now issued as U.S. Pat. No. 10,016,614) titled Wearable cardioverter defibrillator (WCD) system making shock/no shock determinations by aggregating aspects of multiple patient parameters, which is incorporated by reference in its entirety for all purposes.

The processor 1030 may include additional modules, such as module 1036 for various other functions such as, but not limited to, an electrode contact monitoring module 1036.

In an example, the defibrillator device 1000 may include a memory 1038, which may work together with the processor 1030. The memory 1038 may be implemented in a wide variety of manners. For example, the memory 1038 may be implemented such as, but not limited to, nonvolatile memories (NVM), read-only memories (ROM), random access memories (RAM), and so forth or any combination thereof. The memory 1038 may include programs for the processor 1030, and so on. For example, the memory 1038 may include ECG signals for determining a respiration rate post-event. The programs may include operational programs executed by the processor 1030 and may also include protocols and methodologies so that decisions may be made by advice module 1034. Additionally, the memory 1038 may store various prompts for the user 1080, etc. Moreover, the memory 1038 may store a wide variety of information (i.e., data) such as, but not limited to information regarding the person 1080.

The defibrillator 1000 may also include a power source 1040. In order to facilitate portability of defibrillator device 1000, the power source 1040 may include a battery type device. A battery type device may be implemented as a battery pack, which may be rechargeable or not-rechargeable. At times, a combination of rechargeable and non-rechargeable battery packs may be utilized. Examples of power source 1040 may include AC power override, where AC power may be available, and so on. In some examples, the processor 1030 may control the power source 1040.

Additionally, the defibrillator device 1000 may include an energy storage module 1050. The energy storage module 1050 may be configured to store some electrical energy (e.g., when preparing for sudden discharge to administer a shock). The energy storage module 1050 may be charged from the power source 1040 to an appropriate level of energy, as may be controlled by the processor 1030. In some implementations, the energy storage module 1050 may include one or more capacitors 1052, and the like.

The defibrillator 1000 may include a discharge circuit 1055. The discharge circuit 1055 may be controlled to facilitate discharging of the energy stored in energy storage module 1050 to the nodes 1014 and 1018, and also to electrodes 108 and 108 (shown in FIG. 1). The discharge circuit 1055 may include one or more switches 1057. The one or more switches 1057 may be configured in a number of manners such as, but not limited to, an H-bridge, and so forth.

The defibrillator device 1000 may further include a user interface 1070 for the user 1080. The user interface 1070 may be implemented in a variety of manners. For example, the user interface 1070 may include a display screen capable of displaying what is detected and measured, provide visual feedback to the user 1080 for their resuscitation attempts, and so forth. The user interface 1070 may also include an audio output such as, but not limited to, a speaker to issue audio prompts, etc. The user interface 1070 may additionally include various control devices such as, but not limited to, pushbuttons, keyboards, switches, track pads, and so forth. Additionally, the discharge circuit 1055 may be controlled by the processor 1030 or directly by the user 1080 via the user interface 1070, and so forth.

Additionally, the defibrillator device 1000 may include other components. For example, a communication module 1090 may be provided for transmitting ECG signals stored on the defibrillator device 1000 to be downloaded and processed as described above. Such communication may be performed wirelessly, or via wire, or by infrared communication, near field communication (NFC), Bluetooth, WiFi, and so forth. Accordingly, information may be communicated, such as person data, incident information, therapy attempted, CPR performance, ECG information, and so forth.

A feature of a defibrillator device may be CPR related prompting. CPR prompts may be issued to the user 1080 visually or by audio facilitating assistance in the administration of CPR by the user 1080. Examples may be found in U.S. Pat. Nos. 6,334,070 and 6,356,785.

Figure 11:
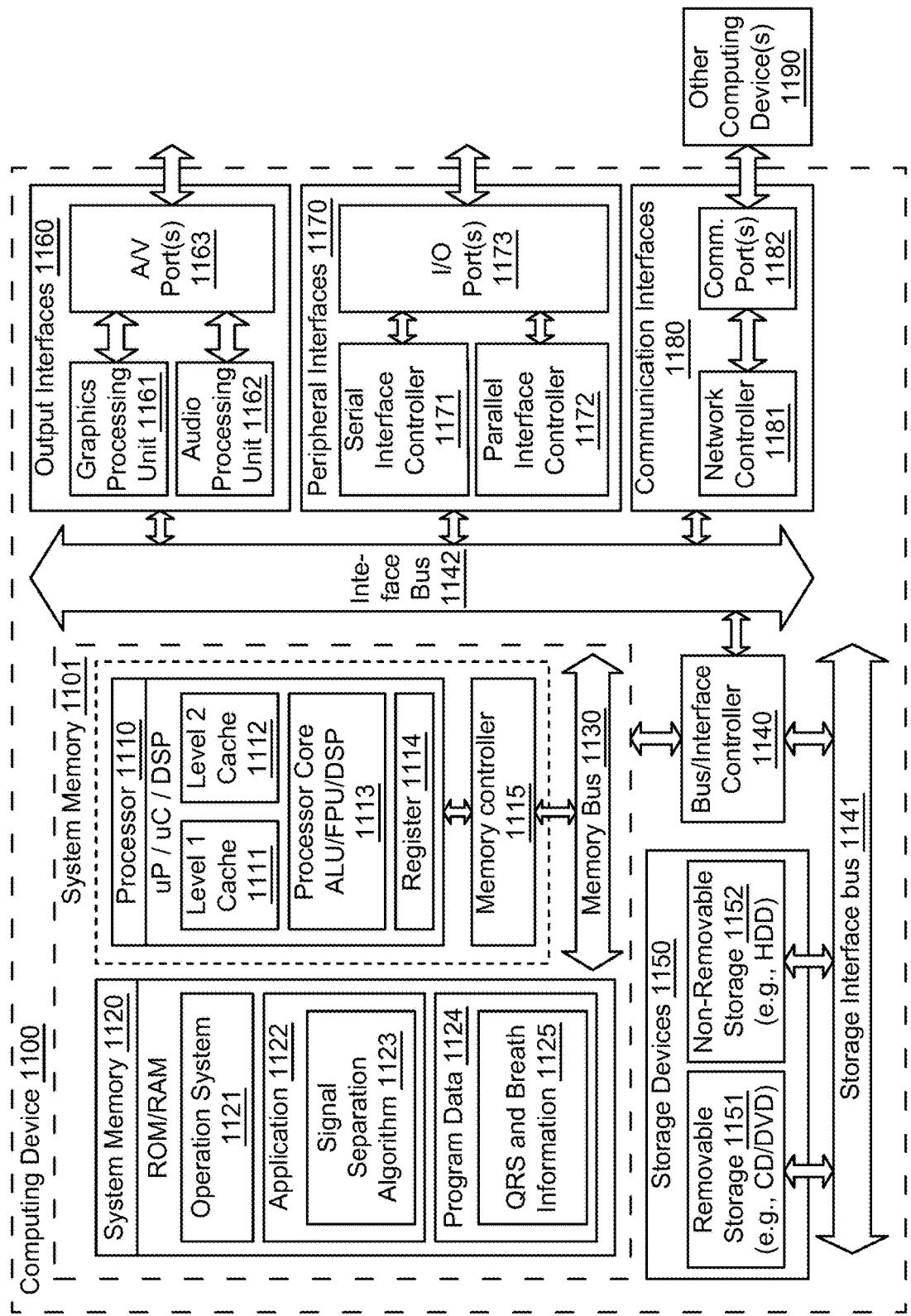
FIG. 11 is a block diagram illustrating an example computing device, such as might be embodied by a person skilled in the art, which is arranged in accordance with at least some embodiments of the present disclosure.

FIG. 11 is a block diagram illustrating an example computing device 1100, such as might be embodied by a person skilled in the art, which is arranged in accordance with at least some embodiments of the present disclosure. In one example configuration, computing device 1100 may include one or more processors 1110 and system memory 1120. A memory bus 1130 may be used for communicating between the processor 1110 and the system memory 1120.

Depending on the desired configuration, processor 1110 may be of any type including but not limited to a microprocessor (µP), a microcontroller (µC), a digital signal processor (DSP), or any combination thereof. Processor 1110 may include one or more levels of caching, such as a level one cache 1111 and a level two cache 1112, a processor core 1113, and registers 1114. The processor core 1113 may include an arithmetic logic unit (ALU), a floating point unit (FPU), a digital signal processing core (DSP Core), or any combination thereof. A memory controller 1115 may also be used with the processor 1110, or in some implementations the memory controller 1115 may be an internal part of the processor 1110.

Depending on the desired configuration, the system memory 1120 may be of any type including but not limited to volatile memory (such as RAM), non-volatile memory (such as ROM, flash memory, etc.) or any combination thereof. System memory 1120 may include an operating system 1121, one or more applications 1122, and program data 1124. Application 1122 may include separation of changes in DC signal from ECG signal algorithm 1123 that is arranged to perform the functions as described herein including the functional blocks and/or actions described. Program Data 1124 may include, among other information described, QRS and breathing rate data 1125 for use with signal processing algorithm 1123. In some example embodiments, application 1122 may be arranged to operate with program data 1124 on an operating system 1121 such that implementations of defibrillator electrodes having communicative capabilities may be provided as described herein. For example, apparatus described in the present disclosure may comprise all or a portion of computing device 1100 and be capable of performing all or a portion of application 1122 such that determining respiration rates as described herein. This described basic configuration is illustrated in FIG. 11 by those components within dashed line 1101.

Computing device 1100 may have additional features or functionality, and additional interfaces to facilitate communications between the basic configuration 1101 and any required devices and interfaces. For example, a bus/interface controller 1140 may be used to facilitate communications between the basic configuration 1101 and one or more data storage devices 1150 via a storage interface bus 1141. The data storage devices 1150 may be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable, and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of device 1100.

Computing device 1100 may also include an interface bus 1142 for facilitating communication from various interface devices (e.g., output interfaces, peripheral interfaces, and communication interfaces) to the basic configuration 1101 via the bus/interface controller 1140. Example output interfaces 1160 may include a graphics processing unit 1161 and an audio processing unit 1162, which may be configured to communicate to various external devices such as a display or speakers via one or more A/V ports 1163. Example peripheral interfaces 1170 may include a serial interface controller 1171 or a parallel interface controller 1172, which may be configured to communicate with external devices such as input devices (e.g., keyboard, mouse, pen, voice input device, touch input device, etc.) or other peripheral devices (e.g., printer, scanner, etc.) via one or more I/O ports 1173. An example communication interface 1180 includes a network controller 1181, which may be arranged to facilitate communications with one or more other computing devices 1190 over a network communication via one or more communication ports 1182. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 1100 may also be implemented as a personal computer including both laptop computer and non-laptop computer configurations. In addition, computing device 1100 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, as apparent from the following discussion, it is appreciated that throughout this specification discussion utilizing terms such as "processing," "computing," "calculating," "determining" or the like refer to actions or processes of a computing device that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as those employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon that, when executed by a computing device such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skilled in the art in light of this disclosure. In addition, those skilled in the art will appreciate that the mechanisms of the subject matter described herein are capable of being distributed as a product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter is not to be limited to the particular examples disclosed, but that such claimed subject matter also may include all implementations falling within the scope of the appended claims, and equivalents thereof.

What is claimed:

1. A method for providing therapy to a user of a wearable cardioverter defibrillator (WCD) based on determining a respiration rate of the user of the WCD, the method comprising:
    injecting a direct current (DC) signal into two or more electrodes of the WCD;
    receiving an indication of a change of the DC signal at the two or more electrodes, the received indication being included in a plurality of electrical signals that are received from the two or more electrodes;
    separating the received indication of the change of the DC signal from the received plurality of electrical signals;
    determining the respiration rate of the user of the WCD based on the separated received indication;
    detecting whether the determined respiration rate is within a predetermined rate;
    determining whether a heart rate of the user falls within a ventricular tachycardia (VT) zone; and
    providing the therapy in form of an electric shock to the user of the WCD, via a plurality of therapy electrodes, based on at least detecting that the heart rate falls within the VT zone and further based on detecting that the determined respiration rate falls outside the predetermined rate.

2. The method of claim 1, wherein injecting the DC signal comprises injecting a direct current.

3. The method of claim 2, wherein separating the received indication comprises comparing a DC voltage corresponding to the injected direct current with a reference DC voltage.

4. The method of claim 3, wherein comparing the DC voltage comprises determining a change in resistance of the two or more electrodes.

5. The method of claim 1, wherein receiving the indication of the change of the DC signal comprises receiving an indication of a change of resistance between the two or more electrodes.

6. The method of claim 1, wherein separating the received indication comprises filtering Q wave, R wave, S wave (QRS) complex from the plurality of electrical signals.

7. The method of claim 1, further comprising filtering the separated received indication corresponding to the respiration rate of the user of the WCD, to determine Q wave, R wave, S wave (QRS) complex from the plurality of electrical signals.

8. The method of claim 7, wherein the filtering is performed using a high pass filter.

9. The method of claim 1, wherein separating the received indication comprises detecting peaks of the received plurality of electrical signals.

10. The method of claim 1, further comprising:
processing the separated received indication of the change of the DC signal, to indicate detection of breaths of the user of the WCD as peaks,
wherein determining the respiration rate of the user of the WCD comprises determining an inverse of a median of intervals between the detected breaths.

11. A multichannel electrocardiogram (ECG) monitor, comprising:
two or more electrodes;
an electrode contact monitoring module communicatively coupled to the two or more electrodes, wherein the electrode contact monitoring module is configured to inject a direct current (DC) signal into the two or more electrodes;
a signal processing module communicatively coupled to the two or more electrodes and the electrode contact monitoring module, wherein the signal processing module is configured to:
receive an ECG signal from the two or more electrodes,
receive an indication of a change of the DC signal at the two or more electrodes,
separate the received indication of the change of the DC signal from the received ECG signal, and
determine a respiration rate of a user of the multichannel ECG monitor based on the separated received indication;
determine whether a heart rate of the user falls within a ventricular tachycardia (VT) zone;
an advice module, communicatively coupled to at least the signal processing module, configured to determine whether the user of the multichannel ECG monitor requires a therapy responsive to a detection that the heart rate falls within the VT zone and further based on a detection that the determined respiration rate falls outside a predetermined rate; and
a plurality of therapy electrodes configured to administer therapy in form of an electric shock to the user of the multichannel ECG monitor based on a determination that the user of the multichannel ECG monitor requires the therapy.

12. The multichannel ECG monitor of claim 11, wherein the signal processing module is configured to determine a consistent channel for determining the respiration rate.

13. The multichannel ECG monitor of claim 11, wherein the electrode contact monitoring module comprises lead-off circuitry.

14. The multichannel ECG monitor of claim 11, wherein the electrode contact monitoring module comprises a DC coupled preamplifier.

15. The multichannel ECG monitor of claim 11, wherein the signal processing module comprises a low pass filter and a high pass filter.

16. A wearable cardioverter defibrillator (WCD), comprising:
two or more electrodes;
an electrode contact monitoring module communicatively coupled to the two or more electrodes, wherein the electrode contact monitoring module is configured to inject a direct current (DC) signal into the two or more electrodes;
a signal processing module communicatively coupled to the two or more electrodes and the electrode contact monitoring module, wherein the signal processing module is configured to:
receive an electrocardiogram (ECG) signal from the two or more electrodes,
receive an indication of a change of the DC signal at the two or more electrodes,
separate the received indication of the change of the DC signal at the two or more electrodes, and
determine a respiration rate of a user of the WCD based on the separated received indication;
determine whether a heart rate of the user falls within a ventricular tachycardia (VT) zone;
an advice module, communicatively coupled to at least the signal processing module, configured to determine whether the user of the WCD requires a therapy in response to a detection whether the heart rate falls within the VT zone and whether the determined respiration rate is within a predetermined rate; and
a plurality of therapy electrodes configured to provide therapy in form of an electric shock to the user of the WCD in response to a detection that the heart rate falls within the VT zone and further based on a detection that the determined respiration rate falls outside the predetermined rate.

17. The WCD of claim 16, wherein the electrode contact monitoring module comprises lead-off circuitry.

18. The WCD of claim 16, wherein the electrode contact monitoring module comprises a DC voltage coupled preamplifier.

19. The WCD of claim 16, wherein the signal processing module comprises a low pass filter and a high pass filter.

* * * * *